United States Patent [19]

Kramer

[11] Patent Number: 4,799,653

[45] Date of Patent: Jan. 24, 1989

[54] RADIAL ATTENUATION

[75] Inventor: Bernhard Kramer, Markdorf, Fed. Rep. of Germany

[73] Assignee: Dornier GmbH, Friedrichshafen, Fed. Rep. of Germany

[21] Appl. No.: 84,443

[22] Filed: Aug. 11, 1987

[30] Foreign Application Priority Data

Aug. 22, 1986 [DE] Fed. Rep. of Germany ....... 3628586

[51] Int. Cl.[4] .............................................. F16F 1/02

[52] U.S. Cl. .................................... 267/136; 403/372

[58] Field of Search .................. 267/140.1, 140.4, 136; 248/359 R, 359 A, 606, 603, 638; 384/202, 215, 218, 192, 37; 277/197; 403/372

[56] References Cited

U.S. PATENT DOCUMENTS

| | | | |
|---|---|---|---|
| 3,063,761 | 11/1962 | Hoddy et al. | 384/202 |
| 3,295,857 | 7/1963 | Lutz | 277/197 |
| 3,947,007 | 3/1976 | Pelat | 267/140.1 |

FOREIGN PATENT DOCUMENTS

| | | | |
|---|---|---|---|
| 776241 | 1/1935 | France | 248/606 |

*Primary Examiner*—Andres Kashnikow
*Assistant Examiner*—Mark T. Le
*Attorney, Agent, or Firm*—Ralf H. Siegemund

[57] ABSTRACT

Concentric rings, tubes or sleeves are separated by radial corrugated sheets or wires in radially aligned grooves for attenuating shocks and vibrations.

4 Claims, 1 Drawing Sheet

RADIAL ATTENUATION

BACKGROUND OF THE INVENTION

The present invention relates to radial shock attenuation and absorption particularly for attenuating radially occurring oscillations, shocks and impacts acting on any kind of round object whereby concurrently an oscillation receiving element is centered and fixed with associated components.

Mechanical engineering generally knows shock absorber and attenuators in a wide variety of construction. For example, oscillation and impacts can be reduced and attenuated through a gas pressure attenuator, an oil attenuator or by means of compressing a closed air cushion. Utilization of rubber parts or mounting vibrating components in rubber is also a useful approach for obtaining attenuation. Coaxial tubing being e.g. supported in relation to each other in a vibration attenuating manner through a properly contoured wire cushion arranged in between the two tubes. These wire meshes like cushions are, however, rather expensive and do not permit the tubing to be centered in relation to each other as far as axial vibrations are concerned; they are too yielding in an asymmetric, isotropic fashion.

DESCRIPTION OF THE INVENTION

It is an object of the present invention to provide a new and improved attenuator for use in concentric rings, tubes, sleeves or the like permitting the taking up of shocks, impacts, vibration and to reduce them or suppress them entirely.

In accordance with the preferred embodiment of the present invention the object is attained in that between inner and outer concentric, annular elements involved, a centering element is provided which is corrugated with peaks and valleys abutting the inner and the outer ring, tube, sleeve or the like to resiliently support them in relation to each other such that radial shocks, vibrations and impacts are attenuated. The element may be a piece of wire or wires made of spring steel, or a sheet strip or strips also made of spring steel.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
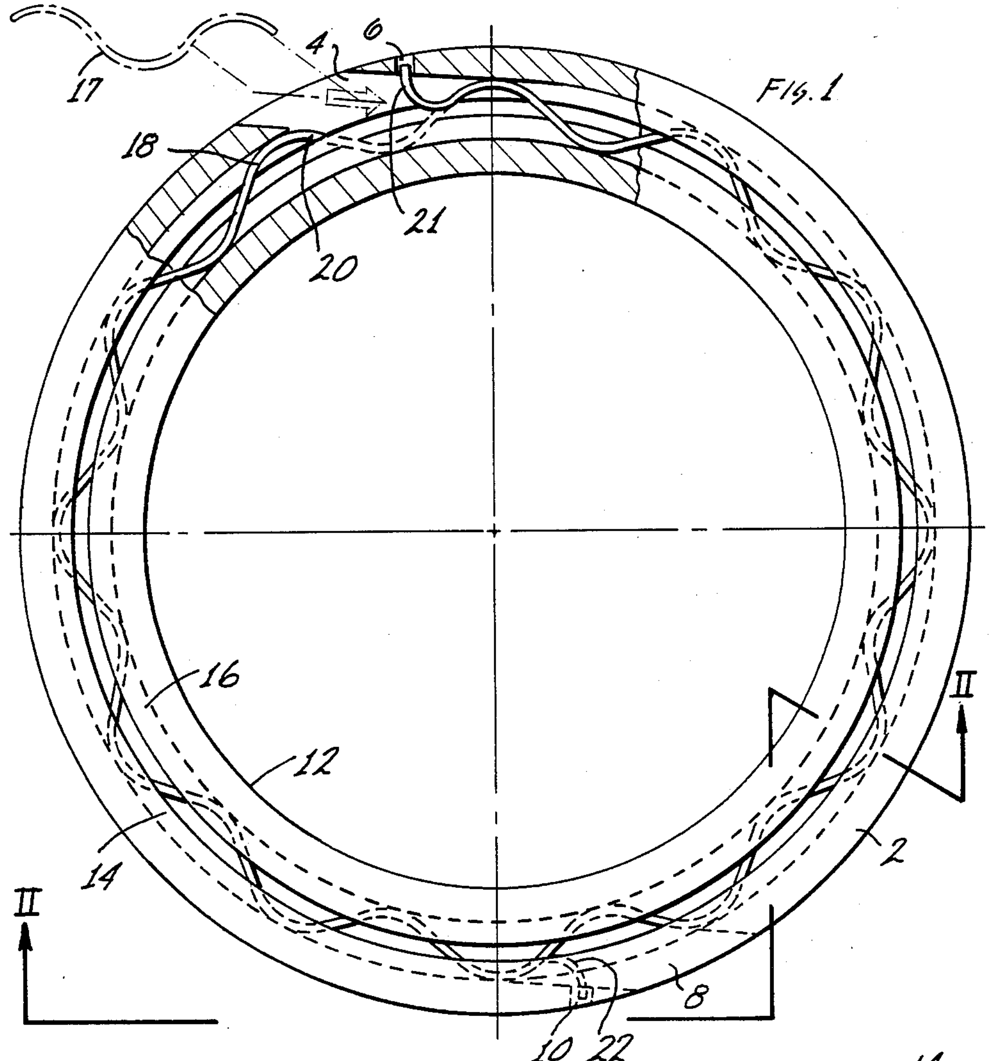
FIG. 1 is a top elevation partially in section in a plane parallel to the elevational plane of the attenuator showing two concentric rings as attenuated in accordance with the preferred embodiment of the present invention for practicing the best mode thereof in conjunction with such a concentric annular arrangement.

Proceeding now to the detailed description of the drawings the figures show an outer ring or annulus 2 with a lateral, tangential radial opening 4 for access to the coaxial interior space between the ring 2 and an inner ring or annulus 12. A second similar opening 8 is provided about 180 degrees offset to the opening 4. A wire fastening bore 6 branches off opening. There is another similar fastening opening 10 provided at the opening 8.

The rings 2 and 12 have, in addition, annular grooves 14 and 16 respectively; the grooves 14 being radially inwardly directed on outer ring 2 while the annular grooves 16 are provided along the outside periphery of the inner ring 12. Moreover, the grooves 14 and 16 are radially aligned in pairs. The grooves have a width which corresponds approximately to the cross sectional diameter of wires 18 and 22. Opening 4 serves for insertion of wavy spring steel wires 18 being bent to assume the wavy contour as illustrated. The two wires 18 and 22 are in fact interposed between the inner ring 12 and the outer ring 2. Each will lodge in respectively two radially aligned grooves 14 and 16. The wire 18 as inserted is in addition biased. The end 20 of wire 18 (as remaining) is also situated in the opening 4 and ends somewhere there. In the final state of the wire installation the other end 21 of the wire 18 is inserted into the wire retention opening 6.

Figure 2:
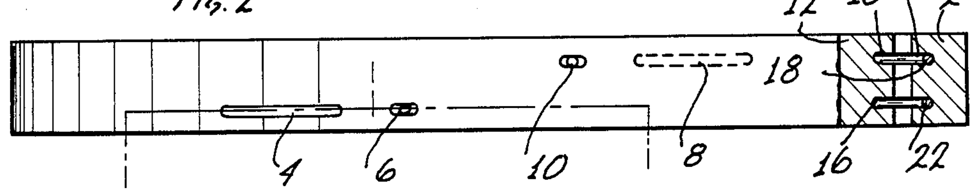
FIG. 2 is a side view of the rings shown in FIG. 1 with a section through a portion of the wall.

The second wire 22 is also inserted in the space between the two rings but through the opening 8. As shown in Fig. 1 and 2 the two wires 18 and 22 are, as far as the wavy pattern is concerned, in axial alignment to each other but that is not essential. It can be seen particularly from FIG. 2 that the wire 18 is situated in one set of grooves and the wire 22 is in the second set of grooves. The wires are placed one next to to each other as shown.

Figure 3:
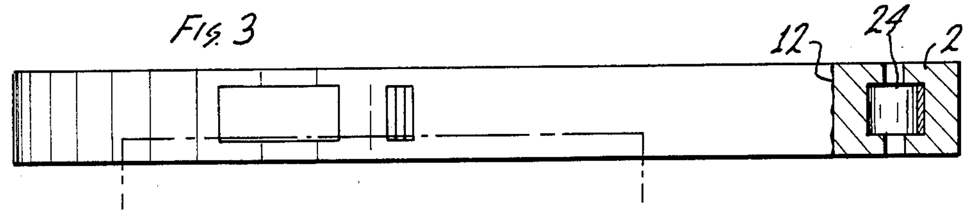
FIG. 3 is a side view similar to FIG. 2 but showing a modified attenuated element.

FIG. 3 illustrates the replacement of the wavy wires by a corrugated strip of sheet metal 24 being inserted in shallow wire grooves 25. Aside from attenuating vibration and impeding the transmission from one ring to another the arrangement is also suitable for centering the two rings in relation to each other. Moreover, on matching the depth of the grooves 14 and 16 particularly in relation to the wires inserted or to match a flat single groove 25 to the width of the corrugated sheet 24 one can fix also these parts axially in relation to each other and avoid axial play.

One instance in which a large number of wires or more than one sheet strips are used is where the stiffness of the assembly in axial direction is to be improved. Depending upon the number (n) of wires the insertion opening should be displaced in relation to each other by angle equal to 360 degrees divided by n. Length and diameter of the rings depend of course on the material used, the shape and number of wires and so forth.

In lieu of rings one can attenuate sleeves and tubes and in this regard FIG. 1 can be interpreted as an end-on view of a pair of sleeves or a pair of tubes. It should also be noted that wires and sheet stock made of spring steel is still a very economic way to proceed so that the manufacturing cost of the radial impact and oscillation attenuator is quite low as compared with prior art devices.

The object and purpose of the arrangement is to attenuate shocks and impacts as well as vibrations as they may occur between the two rings 2 and 12. Basically it is possible that the inner ring receives shocks and vibrations and their transmission onto and into the outer ring 2 is to be avoided, impeded, attenuated to a significant degree. For reasons of generality it is also possible that the outer ring 12 receives impacts and vibrations externally and they should not be transmitted upon the inner ring 2. These vibrations and attenuations are attenuated by the attenuating elements 18 and 22 made of spring steel, each abutting inner as well as outer rings. The cross section of the wire is not essential but the thickness and the quality of the spring steel as well as the number of attenuating elements permits accurate adjustment of the stiffness of the arrangement. One can cover here a rather wide range of adjustment values and situations. The utilization of two wires 18 and 22 as shown is preferred; more may be necessary only in special cases but at least two should be used in order to prevent the two rings from tilting in relation to each other out of a common plane. If, as shown in FIG. 3, a corrugated strip is used rather than a wire, then this function of retaining the two rings in a common plane is assured if that strip 24 is sufficiently wide.

The invention is not limited to the embodiments described above but all changes and modifications thereof, not constituting departures from the spirit and scope of the invention, are intended to be included.

I claim:

1. A device for attenuating radial impacts, shocks and vibrations comprising two radially spaced concentric inner and outer elements of annular construction, at least one wavy attenuating means interposed between the inner and the outer elements for axially holding the inner and outer elements in relation to each other and for engaging both of the inner and outer elements in multiple points of engagement thereby resiliently and radially supporting one of the inner and outer elements in relation to the other; there being openings in one of the inner and outer elements for receiving two ends of the wavy attenuating means; and including annular grooves in the inner and outer elements for receiving the wavy attenuating means.

2. Device as in claim 1, the wavy attenuating means being at least one wire.

3. Device as in claim 1, the wavy attenuating means being at least one corrugated sheet strip.

4. Device as in claim 1, there being plural wavy attenuating means and a corresponding number of azimuthally offset openings in the outer element for wavy attenuating means.

* * * * *